F. H. PAGE.
WING AND SIMILAR MEMBER OF AIRCRAFT.
APPLICATION FILED APR. 27, 1921.
1,414,200. Patented Apr. 25, 1922.
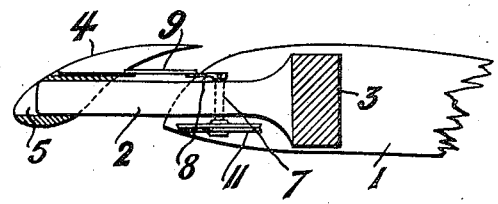
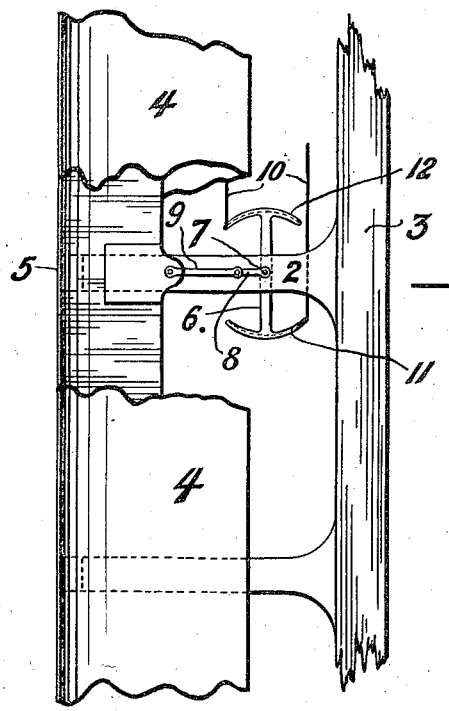

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

WING AND SIMILAR MEMBER OF AIRCRAFT.

1,414,200.         Specification of Letters Patent.     Patented Apr. 25, 1922.

Application filed April 27, 1921. Serial No. 464,896.

*To all whom it may concern:*

Be it known that I, FREDERICK HANDLEY PAGE, a subject of the King of Great Britain, residing at London, England, have invented certain new and useful Improvements in the Wings and Similar Members of Aircraft, of which the following is a specification.

In the specification of Patent No. 1353666, 21st September 1920, wings for aeroplane flying machines have been described, which wings are composed of two or more parts consisting of a wing-section main wing and a forwardly-located part or parts termed auxiliary wings, which latter are also of wing-section and are connected or formed with the main wing, but so that open slots extending substantially through the wing in a direction transversely of the direction of flight exist between either the auxiliary wings, or between an auxiliary wing and the main wing. In some instances the auxiliary wings are pivoted or otherwise adjustable relatively to each other and to the main wing so as to close said slots when required. In the example described in the prior specification, links pivoted on the main wing pivotally carry an auxiliary wing on their ends and by a parallel motion of the said links the auxiliary and main wings can be adjusted in distance in parallel manner, relatively to each other, to open or close the slot or slots.

Now the present invention refers to improved means whereby auxiliary wings can be carried by and supported from the main wing and can be moved relatively thereto so as to wholly or partially open or close slots between the main wing and an auxiliary wing adjacent thereto, or between the auxiliary wings themselves.

According to this invention guide members are provided in connection with the edge of the main wing by which guide members the auxiliary wings are carried, and whereby the auxiliary wings are capable of being slid by a rectilinear parallel motion to or from the edges of the main wing, either parallel to the chord of the main wing, or at any desired downward angle relatively thereto, in such manner that the slots formed between the main wings and auxiliary wings may be wholly or partially opened or closed to suit any required condition during flight, and whereby, where such guide members are given a downward inclination, the auxiliary wing or wings is or are displaced downwards relatively to the main wing as the slot is opened and thereby simultaneously increase the effective camber of the wing structure.

It will be obvious that such auxiliary wings may be located in the front or at the rear of the main wing.

Means are provided by which such adjustment or adjustments of the auxiliary wing or wings may be effected by mechanism within easy reach of the aviator.

In carrying out the invention the guide members consist of a plurality of supporting arms extending from the main wing and beyond the edge thereof, upon the forwardly extending parts of which supporting arms the auxiliary wing or wings is or are slidably mounted, and through guideways in which wing or wings said supporting arms may pass.

In order to adjust the width of the slot formed between the auxiliary and main wings, or to wholly close same, various mechanical devices may be adopted. For instance pivoted levers carried from the main wing or structure of the machine may be connected to the auxiliary wing by links and operated by flexible connections extending to an operating lever within reach of the aviator.

The invention will be further described with reference to the accompanying drawings, wherein Fig. 1 is a part sectional elevation, and Fig. 2 a part plan view, illustrating an example where the supporting arms are carried from the main wing and pass through guideways in the auxiliary wing.

Referring to the drawings, the main wing 1 has a plurality of supporting arms 2 fixed to a spar 3, the supporting arms 2 extending beyond the edge of the main wing 1.

The auxiliary wing 4 is constructed with guideways 5, as shown, extending therethrough, through which guideways the supporting arms 2 extend, so that the auxiliary wing can slide upon the supporting arms 2 with a rectilinear parallel motion to and from the edges of the main wing 1.

The mechanism for effecting the adjustments of position of the auxiliary wing 4 relatively to the main wing 1 is shown at Figs. 1 and 2 as consisting of a two-armed lever 6, the pivot 7 extending from which is supported from the structure of the main wing, and in the instance shown, from one of the supporting arms 2; an arm 8 is fixed to the pivot 7 of the lever 6 and is connected by a pivoted link 9 to the auxiliary wing 4.

Flexible connections 10 extend from both arms of the lever 6 and pass to within easy reach of the operator, and by which the lever 6 can be operated and the auxiliary wing 4 adjusted relatively to the adjacent edge of the main wing.

In the drawing Fig. 2, a preferable arrangement is shown, in which, both when the auxiliary wing 4 is fully distanced from the main wing, and also when the auxiliary wing is brought up to the main wing to close the slot, the link 9 and arm 8 extend parallel with the line of flight.

With the means for operating the arm 8 shown in the drawings it is obviously necessary that the lever 6 should be turned through an angle of 180° in one direction or the other to fully operate the auxiliary wing, and therefore the ends of the lever are fitted with segments 11, 12, the flexible connection being fixed to one end of the segment 11 and to the opposite end of the segment 12.

What I claim as my invention and desire to secure by Letters Patent is:—

1. In aeroplane flying machines; wing structures each comprising a wing-section main wing and a wing-section auxiliary wing extending adjacent the edge of said main wing and in a direction transversely of the line of flight, guide members in connection with the edge of the main wing to slidably carry said auxiliary wing, and means for communicating rectilinear sliding movements of adjustment to said auxiliary wing to or from the edge of said main wing and parallel therewith to close or open a slot between said auxiliary wing and said main wing.

2. In aeroplane flying machines; wing structures each comprising a wing-section main wing and a wing-section auxiliary wing extending adjacent the edge of said main wing and in a direction transversely of the line of flight, guide members in connection with the edge of the main wing and extending parallel to the chord of the main wing to slidably carry said auxiliary wing, and means for communicating rectilinear sliding movements of adjustment to said auxiliary wing to or from the edge of said main wing and parallel therewith to close or open a slot between said auxiliary wing and said main wing.

3. In aeroplane flying machines; wing structures each comprising a wing-section main wing and a wing-section auxiliary wing extending adjacent the edge of said main wing and in a direction transversely of the line of flight, guide members comprising a plurality of supporting arms fixed to and extending from the main wing and beyond the edge thereof to slidably carry said auxiliary wing, and means for communicating rectilinear sliding motions of adjustment to said auxiliary wing upon said guide members extending from said main wing, to and from the edge of said main wing and parallel therewith to close or open a slot between said auxiliary wing and said main wing.

4. In aeroplane flying machines; wing structures each comprising a wing-section main wing, a small forwardly-located auxiliary wing extending adjacent the forward edge of said main wing and in a direction transversely of the line of flight, guide members comprising a plurality of supporting arms fixed to and extending beyond the forward edge of said main wing, said auxiliary wing having guideways formed therethrough to pass over said supporting arms so as to be capable of sliding thereon, and means for communicating rectilinear sliding motions of adjustment to said auxiliary wing upon said guide members extending from said main wing, to and from the edge of said main wing and parallel therewith to close or open a slot between said auxiliary wing and said main wing.

5. In aeroplane flying machines; wing structures each comprising a wing-section main wing and a wing-section auxiliary wing extending adjacent the edge of said main wing and in a direction transversely of the line of flight, a plurality of supporting arms fixed to and extending beyond the edge of said main wing, said auxiliary wing having guideways formed therethrough for the passage of said supporting arms, a pivot pin, bearings in the frame of the main wing to carry said pivot pin, an arm fixed on said pivot pin, a pivoted link to connect the free end of said arm to said auxiliary wing, said arm and said pivoted link being proportioned to assume a straight line in the direction of flight when said auxiliary wing is distanced and also when said auxiliary wing is brought up to the edge of said main wing, a two-armed lever fixed on said pivot pin, and means for moving said two-armed lever through an angle of 180° in either direction to effect rectilinear sliding motions of adjustment of said auxiliary wing upon said supporting arms to and from the edge of said main wing and parallel therewith to close or open a slot between said auxiliary wing and said main wing.

In witness whereof I have hereunto set my hand in the presence of two witnesses.

FREDERICK HANDLEY PAGE.

Witnesses:
 THOMAS WILLIAM ROGERS,
 WALTER JAMES SKERTEN.